(12) United States Patent
Haschke et al.

(10) Patent No.: US 8,938,935 B2
(45) Date of Patent: Jan. 27, 2015

(54) TWO-IN-ONE BAGGER

(75) Inventors: Eggo Haschke, Deerfield, IL (US); Robert Pinto, Chicago, IL (US)

(73) Assignee: Poly-Clip System Corp., Mundelein, IL (US)

( * ) Notice: Subject to any disclaimer, the term of this patent is extended or adjusted under 35 U.S.C. 154(b) by 108 days.

(21) Appl. No.: 11/829,272

(22) Filed: Jul. 27, 2007

(65) Prior Publication Data

US 2008/0022636 A1 Jan. 31, 2008

Related U.S. Application Data

(60) Provisional application No. 60/820,742, filed on Jul. 28, 2006.

(51) Int. Cl.
| | |
|---|---|
| *B65B 43/12* | (2006.01) |
| *B65B 43/36* | (2006.01) |
| *B65B 67/04* | (2006.01) |
| *A22C 21/00* | (2006.01) |
| *B65B 5/04* | (2006.01) |
| *B65B 25/06* | (2006.01) |

(52) U.S. Cl.
CPC ............... *B65B 67/04* (2013.01); *A22C 21/00* (2013.01); *B65B 5/045* (2013.01); *B65B 25/064* (2013.01); *B65B 43/123* (2013.01); *B65B 43/36* (2013.01)
USPC ............. 53/168; 53/258; 53/384.1; 53/385.1; 53/571

(58) Field of Classification Search
CPC ................................. B65B 43/36; B65B 43/34
USPC ........ 53/473, 570, 559, 564, 168, 258, 384.1, 53/385.1

See application file for complete search history.

(56) References Cited

U.S. PATENT DOCUMENTS

| | | | | |
|---|---|---|---|---|
| 3,138,907 | A | * | 6/1964 | Gerbe .......................... 53/385.1 |
| 3,165,870 | A | * | 1/1965 | Saumsiegle et al. ......... 53/385.1 |
| 3,556,316 | A | | 1/1971 | Marasso et al. |
| 3,750,721 | A | * | 8/1973 | Hudson ......................... 53/386.1 |
| 3,872,644 | A | * | 3/1975 | Giraudi et al. ................... 53/168 |
| 3,877,562 | A | * | 4/1975 | Shaw .............................. 53/572 |
| 3,930,352 | A | * | 1/1976 | Carnes .......................... 53/384.1 |
| 4,047,362 | A | * | 9/1977 | Lister et al. ................... 53/385.1 |

(Continued)

FOREIGN PATENT DOCUMENTS

DE 29603999 U1 * 4/1996 ............. B65B 43/36

OTHER PUBLICATIONS

Extended European Search Report which issued in connection with corresponding European Patent Application No. 07813542.3, Oct. 4, 2010, 8 pages.

*Primary Examiner* — Stephen F Gerrity
(74) *Attorney, Agent, or Firm* — Timothy M. McCarthy; Clark Hill PLC

(57) ABSTRACT

The invention comprises a system for encasing material in one of a stretchable bag and a shrinkable bag. The system comprises a pair of product horns rotatable in a plane from a first position to a second position; a stretchable-bag system comprising a bag carriage unit; a shrinkable-bag system, comprising a pair of pulling rollers mounted under the product horns and a collection roller mounted adjacent the pulling rollers, the collection roller configured to move a predetermined increment, a product ram configured to move material between the product horns and into one of a stretchable bag and a shrinkable bag, and an air jet for opening the bags.

5 Claims, 8 Drawing Sheets

(56) References Cited

U.S. PATENT DOCUMENTS

| | | | |
|---|---|---|---|
| 4,241,562 A * | 12/1980 | Meyer | 53/385.1 |
| 4,432,188 A * | 2/1984 | Andrews | 53/572 |
| 4,850,178 A * | 7/1989 | Ausnit | 53/384.1 |
| 4,923,064 A | 5/1990 | Hannon | |
| 5,024,042 A | 6/1991 | Meyer | |
| 6,834,472 B2 * | 12/2004 | Kujubu et al. | 53/258 |
| 6,858,242 B1 * | 2/2005 | Formo | 426/410 |
| 6,895,726 B2 * | 5/2005 | Pinto et al. | 53/384.1 |
| 6,955,029 B2 * | 10/2005 | Palumbo | 53/469 |
| 7,328,540 B1 * | 2/2008 | Rochon | 53/385.1 |
| 2005/0022467 A1 * | 2/2005 | Kujubu et al. | 53/67 |
| 2006/0037285 A1 * | 2/2006 | Cary et al. | 53/139.1 |

* cited by examiner

TWO-IN-ONE BAGGER

CROSS-REFERENCE TO RELATED APPLICATION

This application claims priority from U.S. Provisional Patent Application No. 60/820,742, filed Jul. 28, 2006, the disclosure of which is incorporated herein by reference.

BACKGROUND OF THE INVENTION

This invention is generally directed to a system for encasing materials in plastic bags. A preferred embodiment will be described in which whole poultry is encased in plastic bags. The invention, however, can be used to encase other materials, such as cut-up poultry, whole-muscle meats, cheeses, and non-food items.

The poultry industry sells fowl either as whole dressed birds or as cut-up parts. A consumer can buy a whole dressed chicken in a grocery store, can buy one dressed chicken cut up into parts, or can buy a package of, for example, just legs or just wings. In the two latter situations, the chicken parts are conventionally placed on a disposable tray, typically a plastic or foam material, in order to hold the parts together. Some poultry producers place whole dressed birds on these trays also. The poultry is then encased in plastic, either by a heat-seal process or a plastic bag.

In the heat-seal process, the tray and the poultry (or sometimes just the poultry) are placed in a bag made of a heat-shrinkable material. Sometimes the bag is gathered at its opening to form a neck and a clip is applied to the gathered neck to seal the poultry inside the bag. The bag is then exposed to heat, shrinking the bag around the poultry. This process wraps the product very tightly. In the case of products such as poultry, a tighter package presents a better appearance to consumers.

In the bagging process, the tray and the poultry (or sometimes just the poultry) are placed in a bag, the bag is gathered at its opening to form a neck, and a clip is applied to the gathered neck to seal the poultry inside the bag. This process has the advantage that the heat-shrinking process does not distort markings on the bag.

It is known in the art to use a bagging machine to place poultry in bags, either regular plastic bags or heat-shrinkable bags. Conventional bagging machines have a pair of opposed product horns, movable in a horizontal plane toward and away from each other. Poultry is placed, by hand or by automatic means, in between the product horns, which are in a first position adjacent to each other. A bag is placed over the product horns, which then move away from each other, opening the mouth of the bag wide enough to accommodate the poultry. The poultry is then pushed into the bag, either by hand or by automatic means, such as a ram. Continued pushing of the poultry causes the poultry to push against the bottom of the bag, causing the now-bagged poultry to move out of the space between the two product horns. The now-bagged poultry then is moved, by hand or by automatic means, to a clipping station and/or a heat-shrinking station.

Heat-shrinkable bags conventionally are supplied in a series on a pair of tapes, as will hereinafter be described in more detail. A string of rollers pulls the series of bags to the opening of the product horns. Regular bags are supplied in a stack, typically on a wicket, as will hereinafter be described in more detail. A bag carriage unit carries the stack of bags to the opening of the product horns.

Baggers can place poultry or other material in either type of bag, but the equipment to place the bag at the mouth of the product horns differs for the two types of bags. A processor who packages material in both types of bags may choose to have two bagging systems, which requires more capital investment and may result in one or the other system incurring substantial downtime if there is a demand only for the output of one system at a time. Otherwise, a processor may use one bagger but have two separate pieces of equipment to bring the bags to the product horns. This option incurs substantial downtime to stop the line, remove the one piece of equipment, and connect the other piece of equipment.

There is a clear advantage to being able to switch between types of bags with as little downtime as possible. The present invention provides this advantage.

SUMMARY OF THE INVENTION

The invention comprises a system for encasing material in one of a stretchable bag and a shrinkable bag. The system in a first embodiment comprises a first product horn mounted to a frame and a second product horn mounted to the frame, the horns each rotatable in a plane from a first position in which the product horns are adjacent to a second position in which the product horns are remote; a stretchable-bag system comprising a bag carriage unit movable in a direction perpendicular to the plane, from a first vertical position remote from the product to a second vertical position adjacent to the product horns, the bag carriage unit further configured to move parallel to the plane, from a first horizontal position remote from the frame, to a second horizontal position adjacent the frame, to a third horizontal position underneath the product horns; a shrinkable-bag system comprising a pair of pulling rollers mounted under the product horns, a collection roller mounted adjacent the pulling rollers, and a means for advancing the collection roller a predetermined increment; a product ram configured to move material from a first ram position distal to the first product horn and the second product horn, to a second ram position between the first product horn first portion and the second product horn first portion, to a third ram position proximal to the first product horn first portion and the second product horn first portion; and an air jet mounted below the product horns.

In another embodiment, the system has a first product horn mounted to a frame and a second product horn mounted to the frame, the horns each rotatable in a plane from a first rotational position in which the product horns are adjacent to a second rotational position in which the product horns are remote, the product horns being movable in the plane from a first horizontal position to a second horizontal position; a product ram configured to move material from a retracted ram position remote from the product horns, to a forward adjacent the second horizontal, a stretchable-bag system mounted adjacent the second horizontal position, comprising a bag carriage unit movable in a direction perpendicular to the plane, from a first vertical position remote from the product to a second vertical position adjacent to the product horns, a shrinkable-bag system, comprising a pair of pulling rollers mounted under the product horns, a collection roller mounted adjacent the pulling rollers, and a means for advancing the collection roller a predetermined increment; and an air jet mounted below the product horns.

BRIEF DESCRIPTION OF THE SEVERAL VIEWS OF THE DRAWINGS

The organization and manner of the structure and operation of the invention, together with further objects and advantages thereof, may best be understood by reference to the following description, taken in connection with the accompanying drawings:

FIG. 2b is a side view of the series of FIG. 2a.

DETAILED DESCRIPTION OF THE ILLUSTRATED EMBODIMENTS

Figure 1:
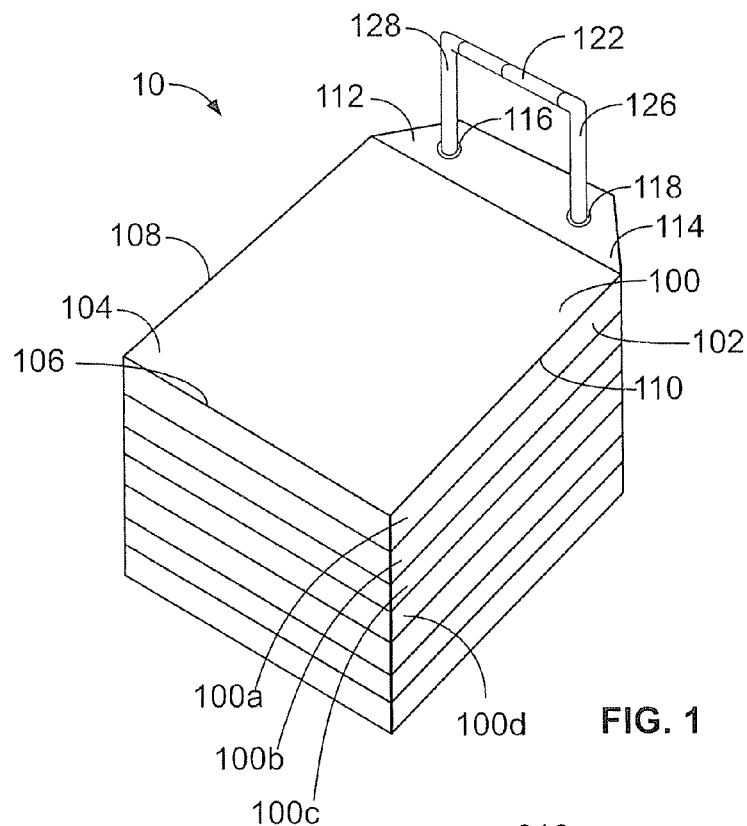
FIG. 1 is a perspective view of a stack of stretchable bags as used in the preferred embodiment of the invention.

While the invention may be susceptible to embodiments in different forms, there is shown in the drawings, and herein will be described in detail, a specific embodiment with the understanding that the present disclosure is to be considered an exemplification of the principles of the invention, and is not intended to limit the invention to that as illustrated and described herein. For example, the present disclosure describes the method and apparatus as used to encase chickens and chicken parts, but the same method and apparatus can be used for other poultry and for other material without departure from the invention. The invention is also described for use with stretchable bags and shrinkable bags, but can be used with other types of bags as well.

Figure 3:
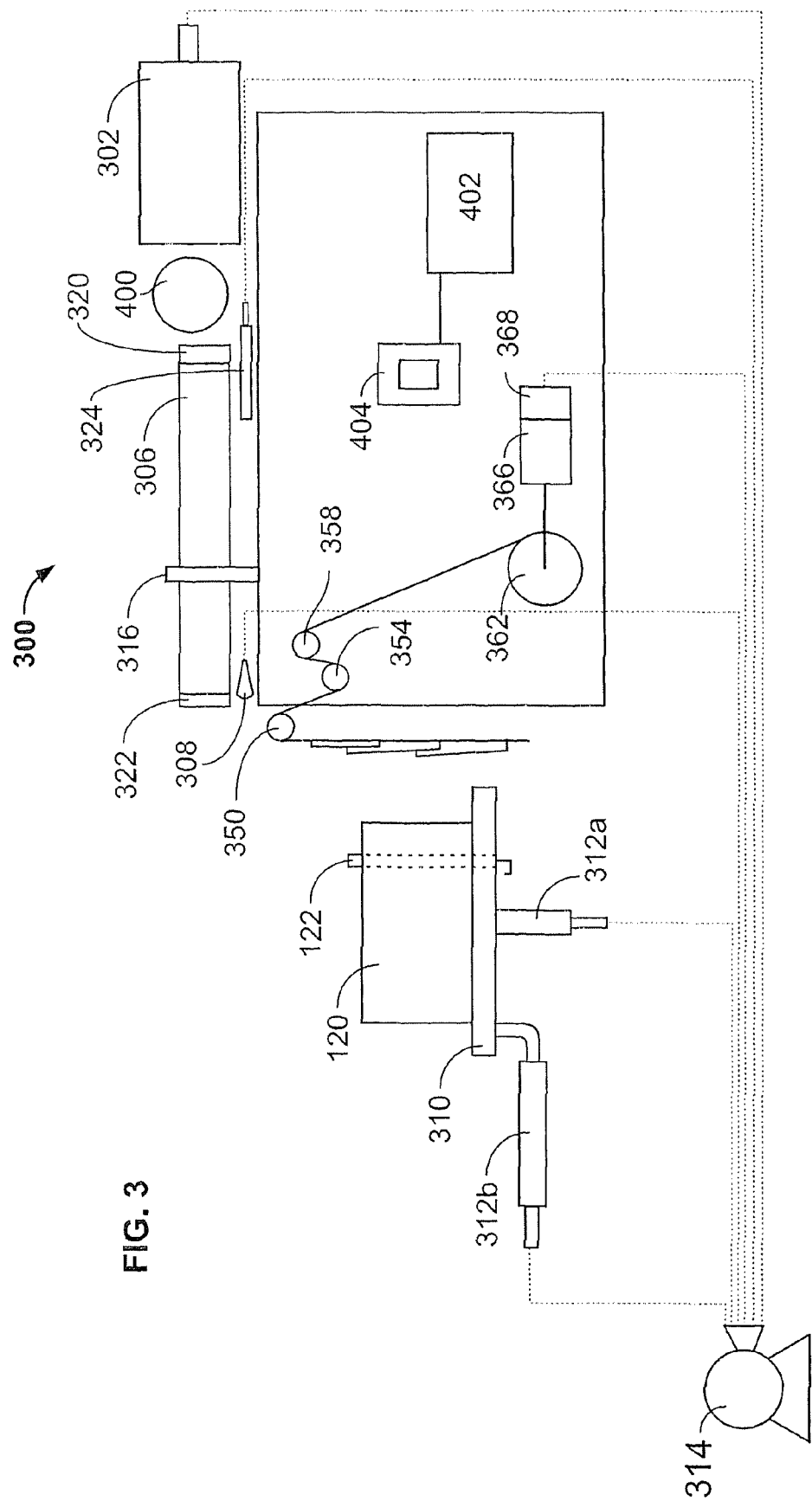
FIG. 3 is a side view of the bagger of the preferred embodiment of the invention.

A stretchable bag 100, shown in FIG. 1, as used to enclose material such as poultry, has a lower sheet 102 and an upper sheet 104, attached on the bottom 106 and on two sides 108, 110, leaving an opening 112 at the top of upper sheet 104. Lower sheet 102 has a tab 114 that extends farther than opening 112. Tab 114 has two apertures 116, 118. Manufacturers supply a stack 120 of bags 100a, 100b, 100c, etc., held together with a wicket 122, as shown in FIG. 1. Please note that wicket 122 is shown is only partially inserted in apertures 116, 118 in FIG. 1, but is completely inserted in FIG. 3. Wicket 122 is in the shape of an upside-down U, having a top section 124 and two legs 126, 128. When legs 126, 128 are inserted into apertures 116, 118, respectively, pulled tightly from the bottom and through bag carriage unit 310, as shown in FIG. 3, top section 124 holds tab 114 of first bag 100a tightly against tab 114 of second bag 100b, and so on so that the bags 100a, 100b, 100c, etc. of stack 120 are held together. The distal portions of legs 126, 128 are then fastened to a bag carriage unit, which will be hereinafter described. Please note that bag 100, which is meant to stretch over, for example, a chicken, has a diameter when open approximately equal to the largest cross-section dimension of a dressed chicken.

Figure 2A:
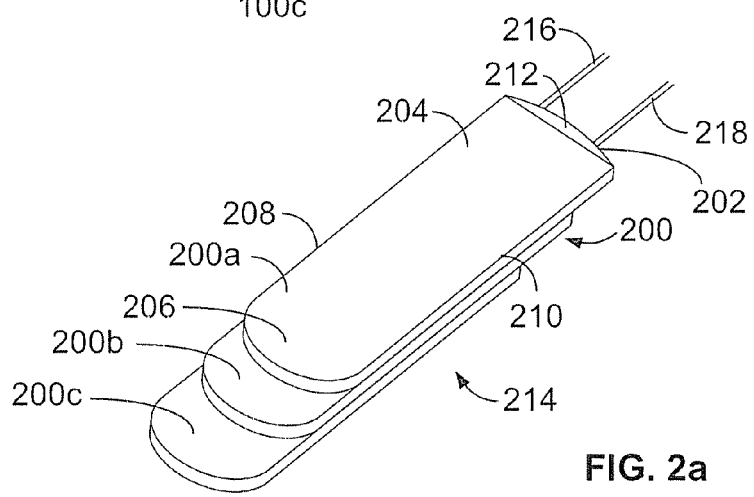
FIG. 2a is a perspective view of a series of shrinkable bags as used in the preferred embodiment of the invention.
Figure 2B:
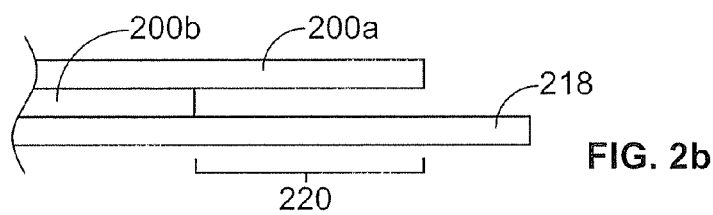

A shrinkable bag 200, shown in FIGS. 2a and 2b, as used to enclose material such as poultry, using the heat-shrinking process described above, has a lower sheet 202 and a top sheet 204, attached at the bottom 206 and two sides 208, 210, leaving an opening 212 at the top. A series 214 of bags 200a, 200b, 200c, are placed on a pair of adhesive tapes 216, 218, offset by a period 220, as shown in FIGS. 2a and 2b. Manufacturers supply series 214 in a box. Please note that bag 200 is meant to heat-shrink over the item, such as a chicken, and accordingly, when open and not yet shrunk, has a diameter larger than the largest cross-section of a chicken and larger, in comparison, than bag 100.

Figure 4:
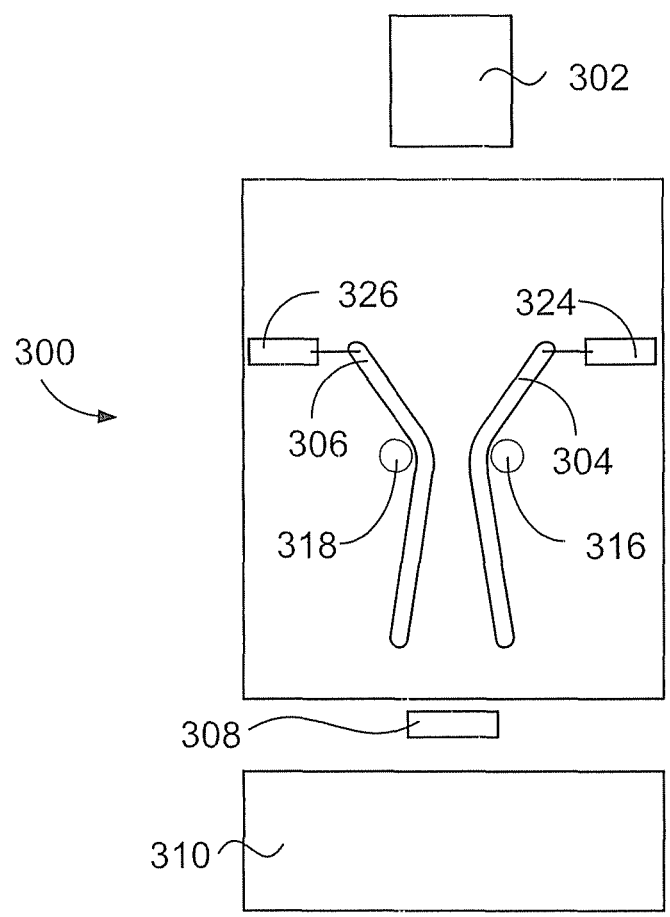
FIG. 4 is a top view of the bagger of FIG. 3.

A bagger 300 as used in the preferred embodiment of the present invention, shown in FIGS. 3 and 4, has a product ram 302, a pair of product horns 304, 306, an air jet system 308, and a bag carriage unit 310, as shown in FIG. 3. Bag carriage unit 310 moves in an up-and-down manner from a lowered position, vertically remote from the product horns 304, 306, to a raised position, vertically adjacent to product horns 304, 306. Bag carriage unit 310 also moves in a back-and-forth manner from a distal position, horizontally remote from product horns 304, 306, to a proximal position, horizontally adjacent to, and just under, product horns 304, 306. An air-actuated cylinder 312a moves bag carriage unit 310 vertically and an air-actuated cylinder 312b moves bag carriage unit 310 horizontally. Both cylinders 312a, 312b are powered by a pressurized air supply 314, such as in a standard plant air system.

Product horns 304, 306 are arcuate members connected to bagger 300 at pivots 316, 318. Product horns each have a proximal portion 320 and a distal portion 322. A pair of air cylinders 324, 326 move product horns 304, 306 from a first position in which each proximal portion 320 to adjacent to the other, and each distal portion 322 is remote from the other, to a second position in which each proximal portion 320 is remote from each other and each distal portion is proximal to the other. Air cylinders 324, 326 are powered by air supply 314.

A stack 120 of bags 100a, 100b, 100c, etc., is placed on bag carriage unit 310, which is in its lowered position vertically and its distal position horizontally, and fastened thereto by wicket legs 126, 128. Product horns 304, 306 are placed in their second position. An item to be packaged, such as a whole chicken 400, is placed between product horns 304, 306, either by hand or by automatic means such as a conveyor belt (not shown). Air cylinder 312a moves bag carriage unit 310 to its raised position and air cylinder 312b moves bag carriage 310 toward its proximal position. As bag carriage unit 310 approaches product horns 304, 306, air jet system 308, which is also coupled to air supply 314, shoots a puff of pressurized air at opening 112 of top bag 100a, causing opening 112 to open. Accordingly, as bag carriage unit 310 continues its horizontal travel, it pulls now-open top bag 100a over product horns 304, 306.

When top bag 100a is over product horns 304, 306, air cylinders 324, 326 move product horns 304, 306 to their first position, stretching bag 100 over product horns 304, 306. Ram 302, also powered by air supply 314, actuates to drive chicken 400 between product horns 304, 306 and therefore into bag 100a. Air cylinder 312a then lowers bag carriage unit 310 to its lowered position, causing top bag 100a to be ripped from stack 120 at tab 114, which is held by wicket 122.

As ram 302 continues its forward stroke, chicken 400 pushes against bottom 106 of bag 100a, pushing bag 100a off product horns 304, 306 and causing bag 100a to collapse around chicken 400. Now encased chicken 400 is conveyed by hand or by mechanical means, not shown, to a clipping station, not shown, for closure of bag 100a. Ram 302 then retracts.

Bag carriage unit is then moved by its air cylinders 312b to its remote position, product horns 304, 306 are moved by air cylinders 324, 326 to their second position, and the cycle repeats.

An electronic control 402 monitors and operates the bagger 300 by controlling the various cylinders. In the preferred embodiment, the electronic control is a standard Siemens central processing unit, with a "power 5 6EP1333-1SL11" power supply, a "Simatic S7-300 314-1AEO4-0AB0" PLC, a 32-output "SM322 321-1BL00-0AA0" card, a 32-input "SM 321 321-ABL00-0AA0" card, and a 16-input "SM 321 321-1BH0S-0AA0" card.

When a user wishes to switch to the use of shrinkable bags, switch 404 is actuated. Bag carriage unit 310 moves to its lowered, distal position. A box containing a series 214 of shrinkable bags 200a, 200b, etc., is placed inside bagger 300 underneath product horns 304, 306. The two tapes 216, 218 are pulled over a pair of pulling rollers 350, underneath a pair of first tension rollers 354, over a pair of second tension rollers 358, and onto a pair of collection rollers 362.

Collection roller 562 is connected to an incremental advance apparatus 566, which is preferably powered by an air cylinder 568, coupled to the plant air supply 514. This arrangement allows tapes 216, 218 to be pulled in increments equal to period 220, so that collection roller 362 advances, upon actuation, a radial distance equal to period 220, then stops.

In operation, when a chicken 400 is placed between product horns 304, 306, which are in their second position, controller 402 causes collection rollers 362, 364 to advance one step, pulling top bag 200a to a position in front of air jet 308. Air jet 308 blows a puff of pressurized air at the opening 212 to top bag 200a, causing opening 212 to widen. Product horns 304, 306 are then moved to their first position and ram 302 actuates to drive chicken 400 forward and into opening 212. Note that, because bag 200 is larger than bag 100, bag 200 need not be pulled over the product horns 304, 306.

When chicken 400 is completely in bag 200, ram 302 retracts. Now encased chicken 400 can be conveyed by hand or by mechanical means, such as a conveyor belt (not shown) to a heat-shrinking station.

When the user wishes to return to the use of stretchable bags 100, the operator, using a knife or scissors, severs tapes 216, 218 and switch 404 is actuated. Bag carriage unit 310 then resumes operation as described above.

Figure 5:
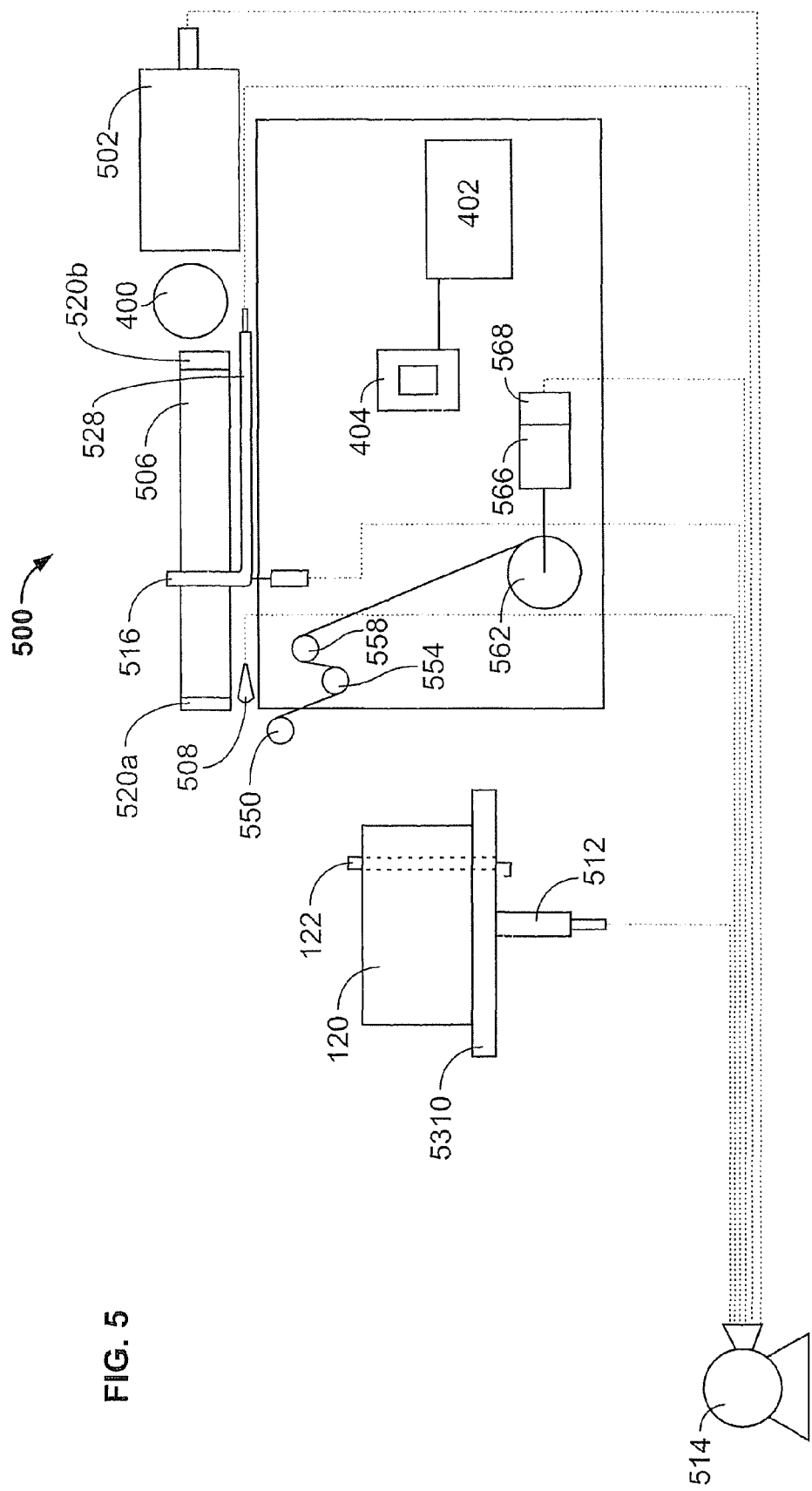
FIG. 5 is a side elevation view of another embodiment of the invention.
Figure 6:
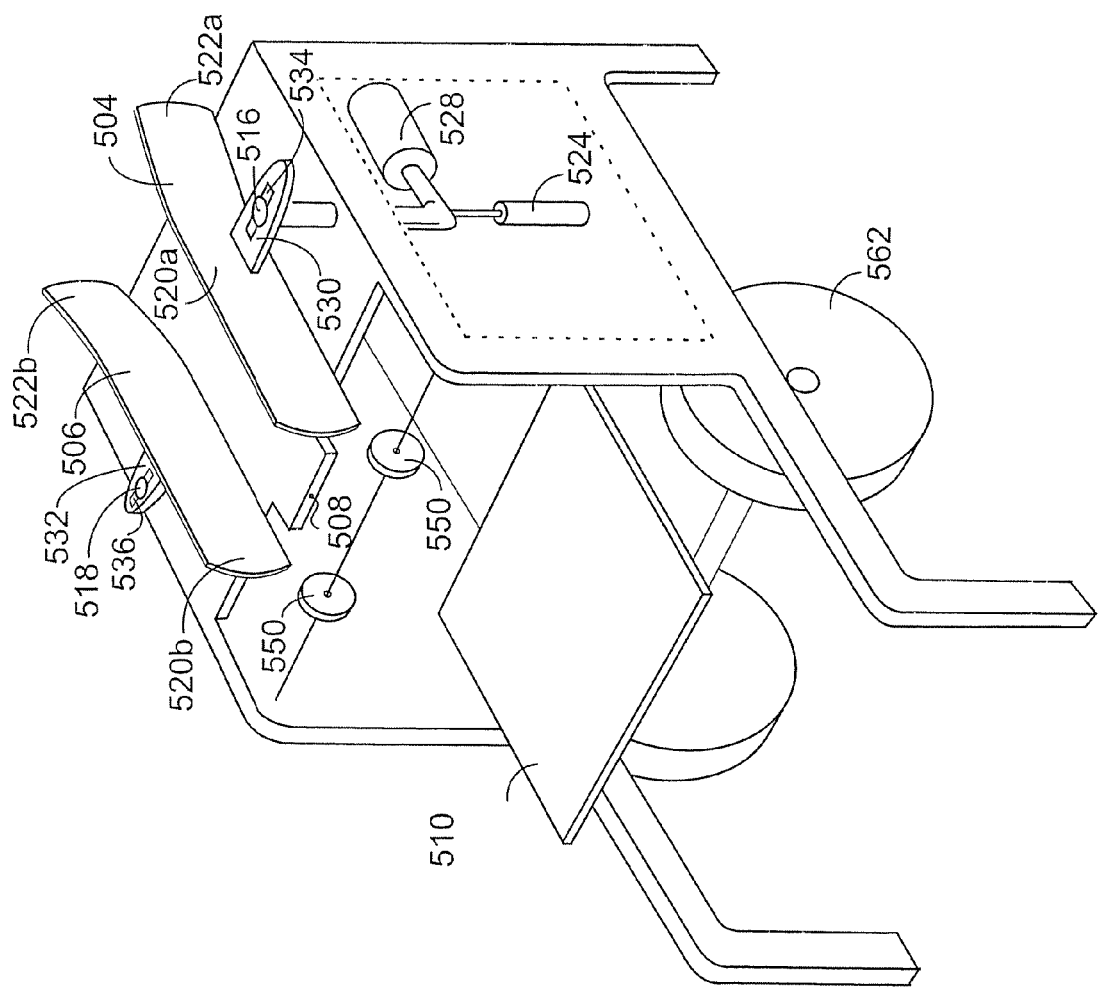
FIG. 6 is a perspective view of the apparatus of FIG. 5.
Figure 7:
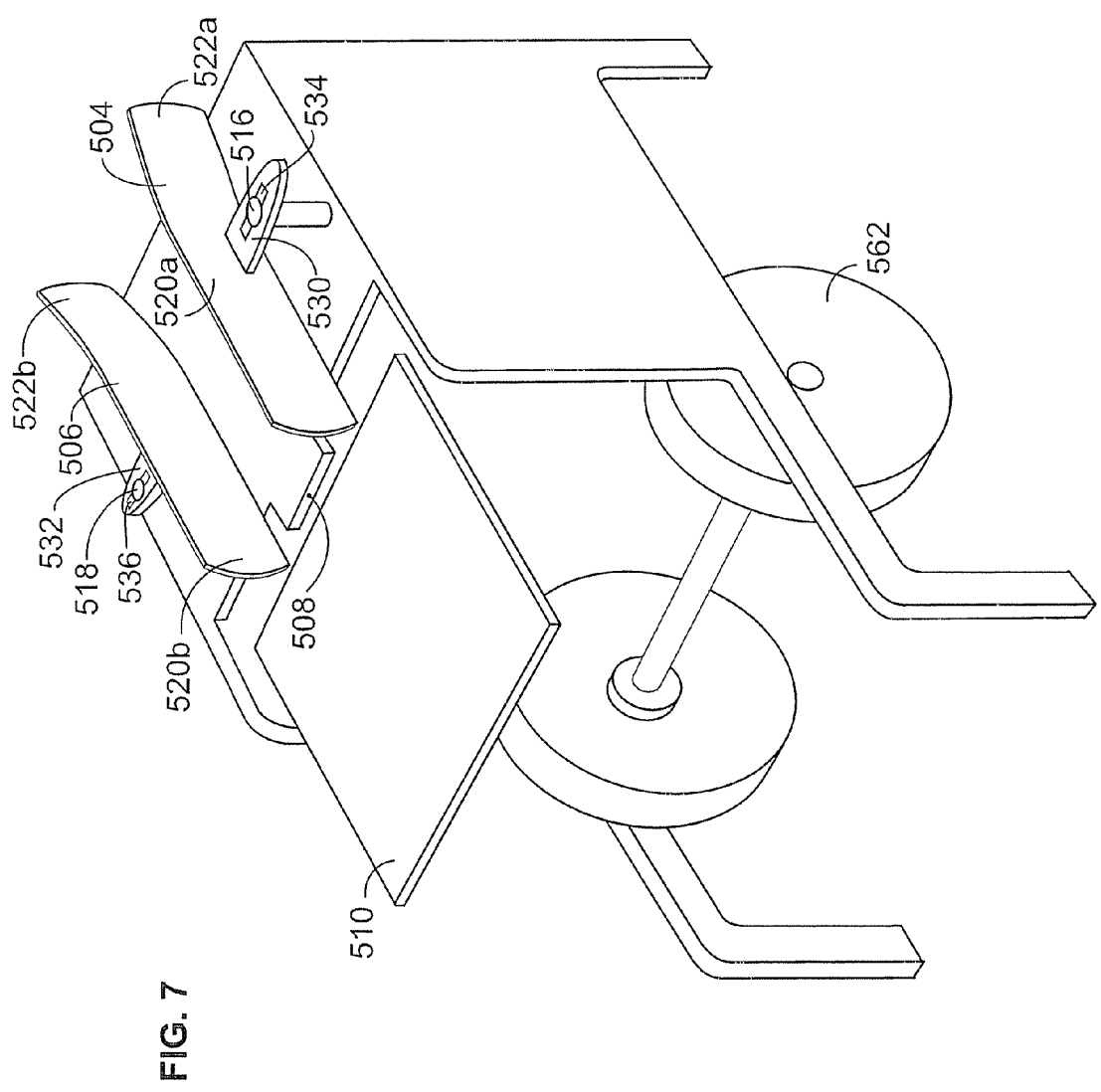
FIG. 7 is another perspective view of the apparatus of FIG. 5.

A bagger 500 as used in another embodiment of the present invention, shown in side elevation view in FIG. 5, has a product ram 502, a pair of product horns 504, 506, an air jet system 508, and a bag carriage unit 510. Bag carriage unit 510 moves in an up-and-down manner from a first vertical position, lowered or vertically remote from the product horns 504, 506, as shown in FIG. 6 to a second vertical position, raised or vertically adjacent to product horns 504, 506, as shown in FIG. 7. An air-actuated cylinder 512 moves bag carriage unit 510 vertically. Cylinder 512 is powered by a pressurized air supply 514, such as in a standard plant air system.

Figure 8C:
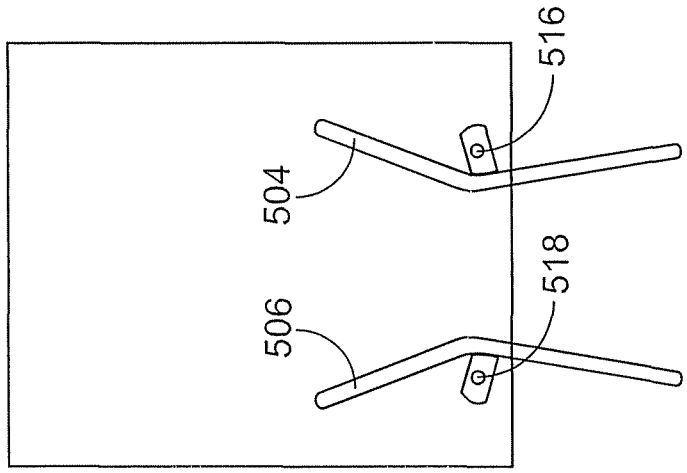
FIGS. 8a through 8c are plan diagrams of the top of the apparatus of FIG. 5.

Product horns 504, 506 are arcuate-shaped members connected to bagger 500 at pivots 516, 518. Product horns 504, 506 each have a proximal portion 504a, 504b, and a distal portion 506a, 506b. A pair of air cylinders 524, 526 rotate product horns 504, 506 about pivot points 516, 518, from a first rotational position in which each proximal portion 504a, 506a is to adjacent to the other, and each distal portion 504b, 506b is remote from the other, as shown in plan view in FIGS. 8a and 8b, to a second rotational position in which each proximal portion 504a, 504a is remote from each other and each distal portion 506a, 506b is proximal to the other, as shown in FIG. 8c. Air cylinders 524, 526 are preferably powered by air supply 514. In other embodiments, product horns 504, 506 are rotated about pivot points 516, 518 by motors, solenoids, or other devices.

Figure 8B:
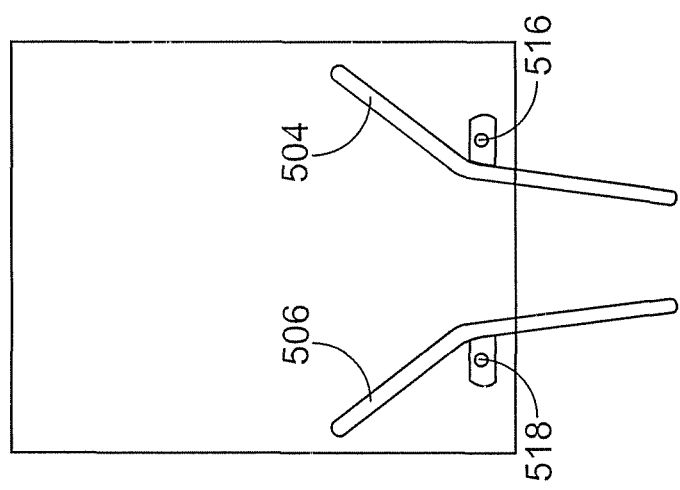
Figure 8A:
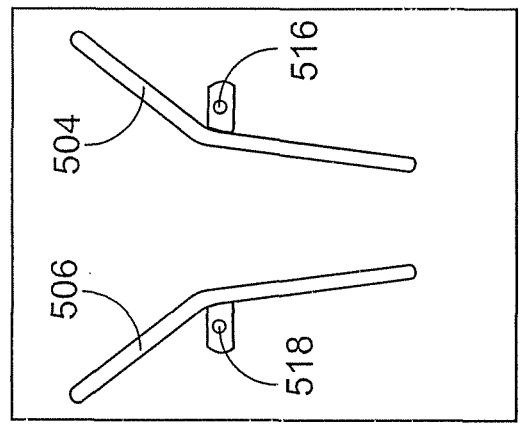

Product horns 504, 506 are also movable in a forward and backward orientation relative to bag carriage unit 510. Air cylinder 528 moves product horns 504, 506 from a first horizontal position in which proximal portions 504a, 506a are remote from bag carriage unit 510, as show in FIG. 8a, to a second horizontal position in which proximal portions 504a, 506a are adjacent to and directly above bag carriage unit 510, as shown in FIGS. 8b and 8c.

Product horn 504 attaches to pivot 516 by ear 530 and product horn 506 attaches to pivot 518 by ear 532. Each ear 530, 532 has a slot 534, 536 so that the distance between each pivot 516, 518 can be adjusted. For example, pivots 516, 518 are placed a large distance apart for large turkeys, and closer together for chickens, and at an intermediate distance for ducks or geese.

Ram 502 is a generally cylindrical member, actuated by air supply 514 from a retracted position, remote from product horns 504, 506, to a forward position, between pivots 516, 518 when product horns 504, 506 are in their second horizontal position.

A stack 120 of bags 100a, 100b, 100c, etc., as described above and as illustrated in preceding Figures, is placed on bag carriage unit 510, which is in its first vertical position, and fastened thereto by wicket legs 126, 128. Product horns 504, 506 are placed in their first rotational position and first horizontal position. An item to be packaged, such as a whole chicken 400, is placed between distal portions 504b, 506b of product horns 504, 506, either by hand or by automatic means such as a conveyor belt (not shown). Air cylinder 512 moves bag carriage unit 510 to its second vertical position. As bag carriage unit 510 approaches product horns 504, 506, air jet system 508, which is also coupled to air supply 514, shoots a puff of pressurized air at opening 112 of top bag 100a, causing opening 112 to open. At that point, air cylinder 528 actuates to move product horns 504, 506 to their second horizontal position, causing proximal portions 504a, 506a to enter into opening 112.

When product horns 504, 506 have move fully to their second horizontal position, air cylinders 524, 526 actuate to rotate product horns 504, 506 to their second rotational position, stretching bag 100 over proximal portions 504a, 506a and increasing the size of opening 112. Ram 502, also powered by air supply 514, actuates to drive chicken 400 between product horns 504, 506 and therefore into bag 100a. Air cylinder 512 then actuates to lower bag carriage unit 510 to its first position. Since top bag 100a is now stretched about chicken 400 and is held in place by proximal portions 504a, 506a, top bag 100a is ripped from stack 120 at tab 114, which is held by wicket 122.

Air cylinder 528 next actuates to retract product horns 504, 506 to their first horizontal position, removing proximal portions 504a, 506a from bag 100a. Ram 502 stays forward at this time, holding chicken 400 in bag 100a, which, no longer being stretched by proximal portions 504a, 504b, collapses around chicken 400. Chicken 400, now encased in a stretchable bag 100a, is conveyed by hand or by mechanical means, not shown, to a clipping station, not shown, for closure of bag 100a. Ram 502 then retracts.

Product horns 504, 506 then rotate back to their first rotational position. Since product horns 504, 506 are now in their first rotational position and first horizontal position and ram 502 is in its retracted position, the cycle can repeat.

Preferably, an electronic control 402 monitors and operates bagger 500 by controlling the various cylinders. Preferably, the electronic control is a standard Siemens central processing unit, with a "power 5 6EP1555-1SL11" power supply, a "Simatic S7-500 514-1AEO4-0AB0" PLC, a 52-output "SM522 521-1BL00-0AA0" card, a 52-input "SM 521 521-ABL00-0AA0" card, and a 16-input "SM 521 521-1BH0S-

0AA0" card. In other embodiments, a command controller is used. In yet other embodiments, the various moving parts are operated manually.

When a user wishes to switch to the use of shrinkable bags, switch 404 is actuated. Bag carriage unit 510 moves to its first position. A box containing a series 214 of shrinkable bags 200a, 200b, etc., is placed inside bagger 500 underneath product horns 504, 506. The two tapes 216, 218 are pulled over bag carriage unit 510, over a pair of pulling rollers 550 mounted on each side of air jet system 508, underneath a pair of first tension rollers 554, over a pair of second tension rollers 558, and onto a pair of collection rollers 562.

Collection roller 562 is connected to an incremental advance apparatus 566, which is preferably powered by an air cylinder 568, coupled to the plant air supply 514. This arrangement allows tapes 216, 218 to be pulled in increments equal to period 220, so that collection roller 562 advances, upon actuation, a radial distance equal to period 220, then stops.

In operation in shrinkable-bag mode, when a chicken 400 is placed between product horns 504, 506, which are in their first rotational position and first horizontal position, controller 402 causes collection rollers 562, 564 to advance one step, pulling top bag 200a to a position in front of air jet 508. Air jet 508 blows a puff of pressurized air at the opening 212 to top bag 200a, causing opening 212 to widen. Product horns 504, 506 are then moved to their second horizontal position, causing proximal portions 504a, 504b to enter opening 212. Product horns 504, 506 then pivot to their second rotational position and ram 502 actuates to drive chicken 400 forward and into opening 212. Product horns 504, 506 then retract to their first horizontal position and rotate back to their first rotational position. Ram 502 stays forward, so that chicken 400 stays in bag 200a.

Chicken 400, now encased in a shrinkable bag 200a, can be conveyed by hand or by mechanical means, such as a conveyor belt (not shown) to a heat-shrinking station. Ram 502 retracts. Collection rollers 562, 564 advance one step, pulling top bag 200a to a position in front of air jet 508, and the cycle repeats.

When the user wishes to return to the use of stretchable bags 100, the operator, using a knife or scissors, severs tapes 216, 218 and switch 404 is actuated. Bag carriage unit 510 then resumes operation as described above.

Figure 9:
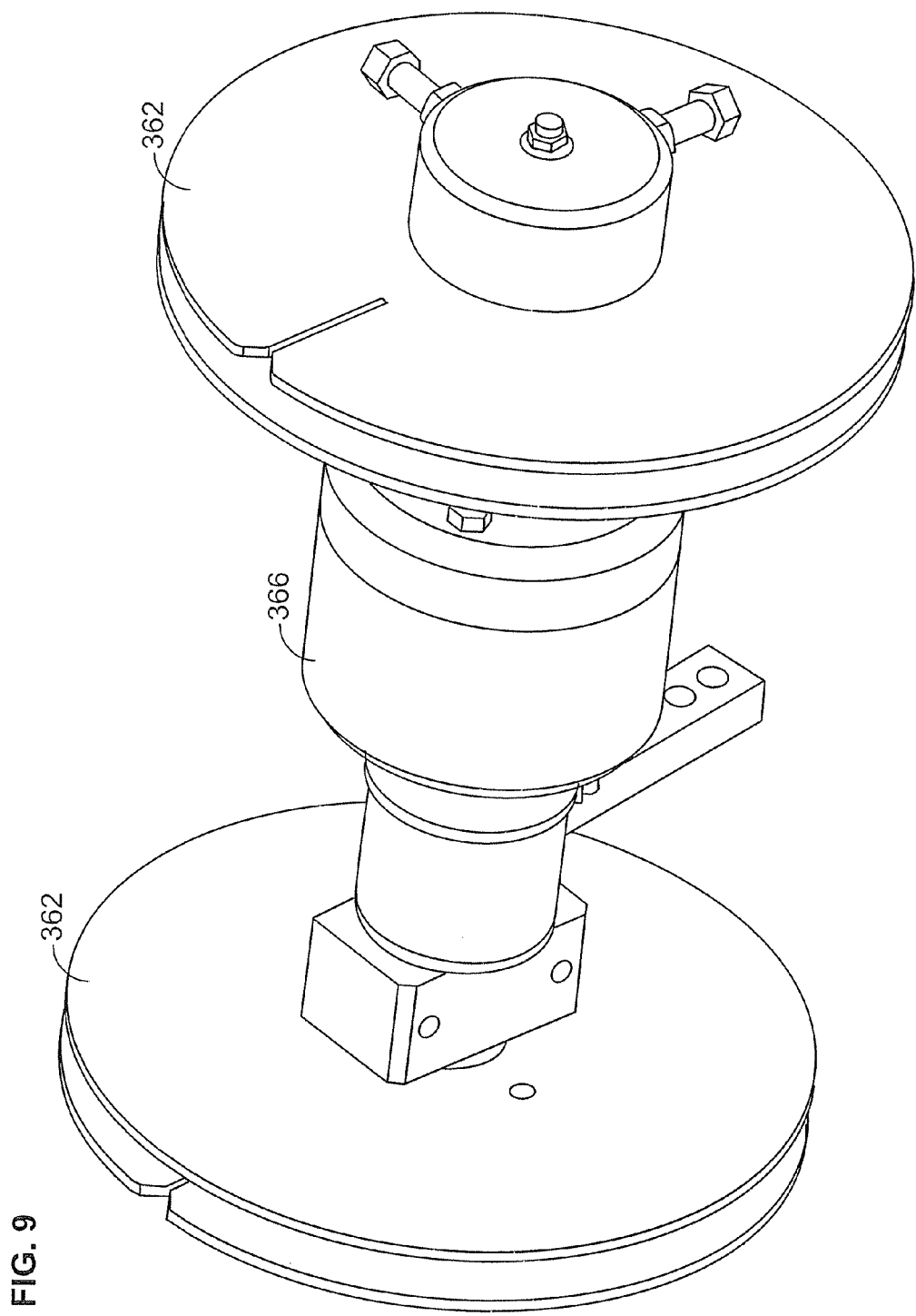
FIG. 9 is a perspective view of the preferred embodiment of the incremental advance system of the present invention.

FIG. 9 is a perspective view of the preferred embodiment of the incremental advance device 362 (or 562) of the present invention. Collection rollers 362 (or 562) are axially connected to system 362 (or 562). Upon receiving a command from controller 402, system 362 (or 562) rotates rollers 362 (or 562) a sufficient amount to advance tapes 216, 218 a linear distance equal to period 220. In a first embodiment, system 362 (or 562) is a gearbox and clutch arrangement, powered by air cylinder 368 (or 568). In other embodiments, the incremental advance system 362 (or 562) is a stepper motor, a sprocket and detent arrangement, or manual dial.

While a preferred embodiment of the present invention is shown and described, it is envisioned that those skilled in the art may devise various modifications of the present invention without departing from the spirit and scope of the appended claims.

We claim:

1. A system for encasing material in one of a stretchable bag and a shrinkable bag, comprising:
    a frame;
    a first pivot member mounted to said frame, and projecting from a plane;
    a second pivot member mounted to said frame and spaced apart from said first pivot member, and projecting from said plane;
    a first product horn mounted to said frame by said first pivot member, said first product horn having a first portion and a second portion, said first portion being angled relative to said second portion such that a vertex is defined between said portions, said first pivot member being provided at said vertex, and said first product horn rotates around said first pivot member, wherein when said first product horn rotates around said first pivot member said angle between said first and second portions of the first product horn does not change;
    a second product horn mounted to said frame by said second pivot member, said second product horn having a first portion and a second portion, said first portion of said second product horn being angled relative to said second portion of said second product horn such that a vertex is defined between said portions of said second product horn, said second pivot member being provided at said vertex of said second product horn, and said second product horn rotates around said second pivot member, wherein when said second product horn rotates around said second pivot member said angle between said first and second portions of the second product horn does not change;
    wherein the first and second product horns are rotatable about the first and second pivot members, respectively, between a first position in which the first portions of the first and second product horns are adjacent one another and the second portions of the first and second product horns are remote from one another, and a second position in which the first portions of the first and second product horns are remote from one another and the second portions of the first and second product horns are adjacent one another;
    a stretchable-bag system, comprising a bag carriage unit movable in a direction perpendicular to said plane, from a first vertical position remote from said product horns to a second vertical position adjacent to said product horns, and upon which stretchable bags are placed;
    a shrinkable-bag system, comprising a pair of pulling rollers mounted under said product horns, a collection roller mounted adjacent said pulling rollers, and an incremental advance device, the collection roller being connected to the incremental advance device to allow tapes, upon which a series of shrinkable bags are placed, with each bag offset from an adjacent bag by a distance, to be pulled in increments equal to the distance;
    a product ram configured to move material from a first ram position distal to said first product horn and said second product horn, to a second ram position between said first product horn first portion and said second product horn first portion, to a third ram position proximal to said first product horn first portion and said second product horn first portion;
    an air jet mounted below said product horns;
    an electronic controller configured to control at least said bag carriage unit and said incremental advance device; and
    a switch to cause said electronic controller to toggle between an operation using the stretchable-bag system and an operation using the shrinkable-bag system.

2. The system of claim 1, wherein the incremental advance device comprises a gearbox and a clutch.

3. The system of claim 1, wherein said bag carriage unit is further configured to move parallel to said plane, from a first horizontal position remote from said frame, to a second horizontal position adjacent said frame, to a third horizontal position underneath said product horns.

4. The system of claim 1, further comprising means for moving said product horns from a first horizontal position remote from said bag carriage unit, to a second horizontal position adjacent to said bag carriage unit.

5. The system of claim 1, further comprising at least one air cylinder connected to said product horns for causing said product horns to rotate around said pivot members.

* * * * *